United States Patent Office 2,828,241
Patented Mar. 25, 1958

---

2,828,241

O,O-DIALKYL S-ARYLMERCAPTO PHOSPHORO-DITHIOATE COMPOSITIONS AND METHOD OF DESTROYING INSECTS

Gail H. Birum, Dayton, Ohio, assignor to Monsanto Chemical Company, St. Louis, Mo., a corporation of Delaware No Drawing. Application May 25, 1954
Serial No. 432,299

4 Claims. (Cl. 167—30)

The present invention relates to organic compounds of phosphorus and sulfur and more particularly provides the arylmercapto esters of certain phosphoric acids, methods of producing the same and insecticidal compositions comprising the new esters. According to the invention there are prepared new and valuable compounds having the formula

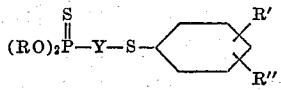

in which R is a hydrocarbon radical free of non-benzenoid unsaturation and containing from 1 to 12 carbon atoms, Y is selected from the class consisting of —O— and —S— and R' and R" are selected from the class consisting of hydrogen, alkyl radicals of from 1 to 8 carbon atoms, halogen radicals, and the radicals —NO$_2$, —CN, and —COOH. Compounds having the above formula are readily obtainable by contacting an appropriate aryl sulfenyl halide with an ester of a phosphoric acid having the formula

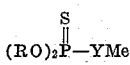

in which R is a hydrocarbon radical free of non-benzenoid unsaturation, Y is selected from the class consisting of —O— and —S— and Me is an alkali metal. As examples of useful phosphorus esters of the above formula may be mentioned the alkali metal O,O-dialkyl phosphorodithioates such as sodium O,O-dibutyl or potassium O,O-dilauryl phosphorodithioates; the alkali metal O,O-diaryl phosphorodithioates such as sodium diphenyl or di-4-xenyl phosphorodithioates; the alkali metal O,O-bis-(alkaryl) phosphorodithioates such as sodium di-2-tolyl phosphorodithioate or lithium bis(4-amylphenyl) phosphorodithioate; the alkali metal aralkyl phosphorodithioates such as sodium dibenzyl phosphorodithioate; and the alkali metal dialkyl phosphorothionates such as sodium or lithium dimethyl or didecyl phosphorothionate; the alkali metal di-aryl phosphorothionates such as sodium diphenyl or di-β-naphthyl phosphorothionate; the alkali metal bis(alkaryl) phosphorothionates such as potassium O,O-di-o-xylyl phosphorothionate; the alkali metal bis-(aralkyl) phosphorothionates such as sodium benzyl 2-phenethyl phosphorothionate, etc.

There may also be used the mixed O,O-diesters of phosphorothionic or phosphorodithioic acid such as potassium amyl 2-ethylphenyl phosphorothionate or lithium O-phenyl O-2-tolyl phosphorodithioate, etc.

Arylsulfenyl halides useful for the present purpose have the formula

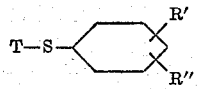

in which R' and R" are as defined above and T denotes halogen. This includes the benzene sulfenyl halides, e. g., benzenesulfenyl chloride, bromide or iodide; the alkyl substituted benzene sulfenyl halides, e. g., 4-toluenesulfenyl chloride, 2,4-diethylbenzenesulfenyl bromide, 2-n-butylbenzenesulfenyl chloride, 4-n-octylbenzenesulfenyl chloride, etc.; the halogen-substituted benzenesulfenyl halides such as 4-chlorobenzenesulfenyl chloride, 2,4-dichlorobenzenesulfenyl chloride, 2-chloro-3-bromobenzenesulfenyl bromide, 2-iodobenzenesulfenyliodide, 4-fluorobenzenesulfenyl chloride, etc.; the nitro-substituted benzenesulfenyl halides such as 4-nitrobenzenesulfenyl chloride or 2,4-dinitrobenzenesulfenyl bromide; the cyano-substituted benzenesulfenyl halides such as 4-(chloromercapto)benzonitrile or 3-(chloromercapto)phthalonitrile; the carboxy-substituted benzenesulfenyl halides such as 4-(bromomercapto)benzoic acid or 4-(iodomercapto) phthalic acid, etc. There may also be used benzenesulfenyl halides such as 4-chloro-2-nitrobenzenesulfenyl chloride, 2-chloro-4-nitrobenzenesulfenyl chloride, 4-chloromercapto-2-nitrobenzonitrile or 4-chloromercapto-3-chlorobenzoic acid i. e., benzenesulfenyl halides having a diversity of substituents in the benzene ring.

Reaction of the alkali metal phosphoric acid compound with the aryl sulfenyl halides to give the present arylmercapto substituted esters proceeds according to the following reaction scheme:

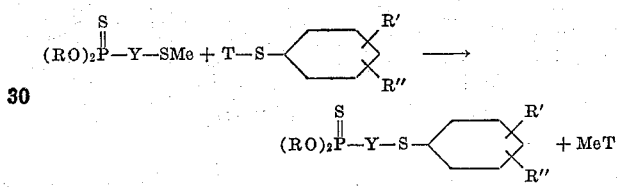

The compounds may be characterized as phosphorothionates or phosphorodithioates having an arylmercapto substituent. Thus, reaction of o-tolylsulfenyl chloride with a potassium dialkyl phosphorothionate gives a dialkyl o-tolylmercapto phosphorothionate; and reaction of a nitrobenzenesulfenyl halide with a sodium O,O-dibenzyl phosphorodithioate gives an O,O-dibenzyl nitrophenylmercapto dithioate.

The present arylmercapto-substituted phosphorus esters are stable, limpid to highly viscous materials which may be used for a wide variety of industrial and agricultural purposes, for example, for plasticizers for synthetic resins and plastics, as lubricant oil additives and biological toxicants. They are more advantageously employed as insecticides, being particularly toxic to leaf-feeding insects when applied as a spray. While some of the present compounds possess a systemic effect when applied to plants, others have little if any systemic action. Generally the present condensates are not phytotoxic at the concentrations at which they possess insecticidal effect.

In preparing the present arylmercapto substituted esters, I prefer to operate substantially as follows: the alkali metal O,O-diester of the phosphorothionic or phosphorodithioic acid is contacted with the arylsulfenyl halide at ordinary or increased temperatures until formation of the mercapto-substituted ester has occurred. Depending upon the individual reactants employed as well as upon the quantities used heating of the mixture of reactants may or may not be required. Generally, however, the condensation reaction is expedited by heating the mixture of reactants at temperatures of from say 50° C. to the refluxing temperature of the reaction mixture. It is also often advantageous to work in the presence of an inert diluent or solvent which conveniently may be the diluent originally employed in preparing the alkali metal phosphorus containing reactant. For example, when preparing the condensate of, say, benzenesulfenyl chloride and sodium dibenzyl phosphorothionate, the alkali metal salt may be prepared by treating sodium dibenzyl phosphite with sulfur in a diluent such as benzene, hexane or ether and the mixture of sodium dibenzyl phosphorothionate and diluent thus obtained may be used directly in the condensation reaction by simply mixing it with the arylsulfenyl halide. The condensation reaction may also be effected at increased or diminished pressure or in the presence of a catalyst known to effect alkali metal halide cleavage; however, the ease of reaction at ordinary atmospheric pressure and in the absence of catalysts generally requires no control of the reaction by pressure variation or acceleration thereof by catalytic means.

The present invention is further illustrated, but not limited, by the following examples:

Example 1

Benzene (450 ml.) and 101 g. (0.4 mole) of potassium O,O-diisopropyl phosphorodithioate were placed in a 4-neck flask equipped with stirrer, thermometer and condenser connected to a Dean-Stark trap, and the mixture was refluxed until water was no longer evolved. A solution of 56.8 g. (0.3 mole) of 2-nitrobenzenesulfenyl chloride in 200 ml. of benzene was then added to this mixture during a time of 30 minutes while maintaining the temperature of the reaction mixture at 23–28° C. by means of external cooling. The whole was then heated at 50–60° C. for 30 minutes, cooled to 5° C., and washed 3 times with ice-water. The organic layer was separated and concentrated to a pot temperature of 75° C./0.8 mm. to give 104 g. (95% theoretical yield) of the red, liquid O,O-diisopropyl S-(2-nitrophenylmercapto) phosphorodithioate, $n_D^{25}$ 1.6028, and analyzing as follows:

|  | Found | Calcd. for $C_{12}H_{18}NO_4PS_3$ |
|---|---|---|
| Percent S | 26.36 | 26.2 |
| Percent P | 7.92 | 8.4 |

Example 2

A mixture consisting of 400 ml. of benzene and 102 g. (0.40 mole) of potassium O,O-diisopropyl phosphorodithioate was refluxed in a 4-neck flask equipped with stirrer, thermometer, reflux condenser and Dean-Stark trap until water no longer collected in the trap. 4-Chlorobenzenesulfenyl chloride (53.7 g., 0.3 mole) was then added during 15 minutes while maintaining the temperature at 43–47° C. by means of external cooling. The whole was then heated at 40–50° C. for 1 hour, washed twice with water and the washed material concentrated to 90° C./0.2 mm. There was thus obtained 103.5 g. (97% theoretical yield) of the substantially pure liquid O,O-diisopropyl S-(4-chlorophenylmercapto) phosphorodithioate, $n_D^{25}$ 1.5838, and analyzing as follows:

|  | Found | Calcd. for $C_{12}H_{18}ClO_2PS_3$ |
|---|---|---|
| Percent C | 40.67 | 40.4 |
| Percent H | 5.20 | 5.08 |
| Percent P | 8.48 | 8.7 |
| Percent S | 27.23 | 26.95 |

Example 3

About 200 ml. of benzene and 12.8 g. (0.4 mole) of powdered sulfur were placed in a 4-neck flask equipped with stirrer, thermometer, condenser and a Dean-Stark water trap, and the mixture was heated until the benzene was dry, as noted by cessation of water-condensation in the water trap. At this point all of the sulfur had dissolved in the benzene. Sodium diethyl phosphite (64 g., 0.4 mole) in 170 g. of benzene was added dropwise to the solution at 68–79° C. during 30 minutes. During refluxing the whole for 1 hour, sodium O,O-diethyl phosphorothionate separated out. The resulting slurry was cooled, and 62.7 g. (0.35 mole) of 4-chlorobenzenesulfenyl chloride was added thereto during 20 minutes while maintaining the temperature of the reaction mixture at 35–55° C. The resulting mixture was refluxed for 1.5 hours and then cooled to 5° C. The orange solution thus obtained was washed twice with about 150 g. of ice-water. Concentration of the washed material to a pot temperature of 82° C./0.2 mm. gave 93.5 g. (78% theoretical yield) of the substantially pure O,O-diethyl S-(4-chlorophenylmercapto) phosphorothionate, $n_D^{25}$ 1.5548, and analyzing as follows:

|  | Found | Calcd. for $C_{10}H_{14}ClO_3PS_2$ |
|---|---|---|
| Percent P | 9.2 | 9.9 |
| Percent S | 19.3 | 20.5 |

Example 4

Testing for insecticidal activity of the O,O-diethyl S-(4-chlorophenylmercapto) phosphorothionate of Example 3 was conducted as follows:

The test chemical was dissolved in acetone to make 70.0 ml. of a 1% solution; and this was further diluted to make 50 ml. of 0.1% solution. Petri dishes were respectively sprayed in a Hoskins horizontal spray chamber by means of a modified Potter sprayer with the respective solutions for 15 seconds at a pressure of 20 p.s.i. Two dishes were sprayed with each solution to provide duplicates. An additional period of 30 seconds was allowed for settling of the mist. Approximately 20 ml. of solution was used for each spraying and the open dishes were held for 24 hours. Then 10 *Tribolium confusion* adults were placed in one set of the duplicate dishes and 10 fourth instar large milkweed nymphs (*Oncopeltus fasciatus*) were placed in the other set of duplicate dishes. The dishes were then held uncovered at room temperature for 4 hours, at which time a 100% kill of both test insects at either the 1.0% or the 0.1% concentration was noted.

Testing of the O,O-diethyl S-(4-chlorophenylmercapto) phosphorothionate of Example 3 as plant spray insecticide was conducted as follows: Emulsions of the chemical were prepared by adding a cyclohexanone solution of the test compound and an emulsifying agent to water to give respective emulsions containing concentrations of 0.4% and 0.2% of the test chemicals. In each case the emulsifier, employed in a quantity of 0.2% by weight based on the weight of the total emulsion, was a mixture of a higher alkylbenzenesulfonate and a polyalkylene glycol known to the trade as "Emulsifier L." Potted bean plants were respectively sprayed to run-off with the emulsions. 24 hours after spraying 5 bean beetle larvae were transferred to the foliage of each of the sprayed plants. The plants were then held 3 days for observation. At the end of that time inspection of the sprayed and infested plants showed a 100% kill of the bean beetle larvae on plants which had been sprayed with either the 0.4% or the 0.2% emulsion.

In still another insecticide test bean plants which had been infested with the 2-spotted spider mite were sprayed with the 0.2% emulsion of the O,O-diethyl S-(4-chlorophenylmercapto) phosphorothionate. The sprayed plants were held 7 days for observation of kill of mobile and resting forms, eggs, and residual effect on the population. At the end of that period, inspection of the sprayed plants showed a high kill of both the adults and eggs and a high residual toxicity.

The systemic insecticidal effect of the O,O-diethyl S-(4-chlorophenylmercapto) phosphorothionate was tested as follows: Black valentine bean plants in the second leaf stage were cut and placed in duplicate respective aqueous solutions of 10 and 100 p. p. m. of the test chemical for 3 days. The plants were then transferred to water and 5 bean beetle larvae were transferred to each of 1 set of the duplicate test plants and 30 to 50 mites to the other of the duplicate test plants. Observation at the end of 3 days of the plants which had been infested with the bean beetles showed a 100% kill of the beetles at even the 10 p. p. m. concentration, and observation at the end of 7 days of the plants which had been infested with the 2-spotted mite showed a 100% kill at the 100 p. p. m. concentration.

Other arylsulfenyl halide-phosphorus ester condensates which may be used as insecticides include condensates of said halides and sodium diamyl phosphorothionate, potassium di-n-hexyl phosphorothionate, sodium O,O-diethyl phosphorodithioate, etc.

The present condensates are generally applied for insecticidal use in the form of sprays or aerosols. The spray may be prepared by dissolving the condensates in the usual organic solvents, e. g., acetone, hexane, benzene or carbon tetrachloride or by incorporating them into aqueous emulsions. The condensates may also be dissolved in liquefied gases such as the fluorochloroethanes or methyl chloride and applied from aerosol bombs made from the solutions.

Instead of employing liquids as carriers and diluents, insecticidal dusts comprising the present condensates may be prepared. For example they may be incorporated with a solid carrier such as talc, clay, lime, bentonite, pumice, fuller's earth, etc. and employed generally as pesticidal dusts.

What I claim is:

1. An insecticidal composition comprising an oil-in-water emulsion containing a toxic quantity of an arylmercapto ester having the formula

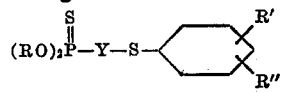

in which R is an alkyl radical of from 1 to 12 carbon atoms, Y is selected from the class consisting of —O— and —S—, and R' and R" are selected from the class consisting of hydrogen, alkyl radicals of from 1 to 8 carbon atoms, halogen radicals, and the radicals —NO$_2$, —CN, and —COOH.

2. An insecticidal composition comprising an oil-in-water emulsion containing a toxic quantity of O,O-diethyl S-(4-chlorophenylmercapto)phosphorothionate as the essential active ingredient.

3. The method of destroying insect pests which comprises exposing said pests to a toxic quantity of an insecticidal composition comprising as the essential effective ingredient an arylmercapto ester having the formula

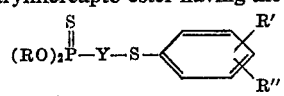

in which R is an alkyl radical of from 1 to 12 carbon atoms, Y is selected from the class consisting of —O— and —S—, and R' and R" are selected from the class consisting of hydrogen, alkyl radicals of from 1 to 8 carbon atoms, halogen, and the radicals —NO$_2$, —CN, and —COOH.

4. The method of destroying insect pests which comprises exposing said pests to a toxic quantity of an insecticidal composition comprising O,O-diethyl S - (4 - chlorophenylmercapto)phosphorothionate as the essential effective ingredient.

References Cited in the file of this patent

Foss: Chemical Abstract, vol. 42, page 2240 (1948).